United States Patent
Hammarström et al.

(10) Patent No.: US 8,582,818 B2
(45) Date of Patent: Nov. 12, 2013

(54) METHOD AND SYSTEM OF AUTOMATICALLY DETECTING OBJECTS IN FRONT OF A MOTOR VEHICLE

(75) Inventors: Per Jonas Hammarström, Linköping (SE); Ognjan Hedberg, Linköping (SE)

(73) Assignee: Autoliv Development AB, Vargarda (SE)

( * ) Notice: Subject to any disclaimer, the term of this patent is extended or adjusted under 35 U.S.C. 154(b) by 179 days.

(21) Appl. No.: 13/148,958

(22) PCT Filed: Feb. 4, 2010

(86) PCT No.: PCT/EP2010/000679
§ 371 (c)(1), (2), (4) Date: Aug. 11, 2011

(87) PCT Pub. No.: WO2010/094401
PCT Pub. Date: Aug. 26, 2010

(65) Prior Publication Data
US 2011/0311103 A1    Dec. 22, 2011

(30) Foreign Application Priority Data
Feb. 17, 2009   (EP) .................................... 09002172

(51) Int. Cl.
*G06K 9/00*    (2006.01)
*G06K 9/68*    (2006.01)

(52) U.S. Cl.
USPC ......................................... 382/104; 382/218

(58) Field of Classification Search
USPC .................. 382/103–104, 209, 218; 701/301
See application file for complete search history.

(56) References Cited

U.S. PATENT DOCUMENTS

| | | | |
|---|---|---|---|
| 7,263,209 B2 | 8/2007 | Camus et al. | |
| 2005/0131646 A1* | 6/2005 | Camus | 701/301 |
| 2005/0232463 A1 | 10/2005 | Hirvonen et al. | |
| 2008/0312831 A1 | 12/2008 | Greene et al. | |

FOREIGN PATENT DOCUMENTS

EP    1 030 188 A1    8/2000

OTHER PUBLICATIONS

International Search Report—Jul. 23, 2010.
Stereo-Based Object Detection, Classification, and Quantative Evaluation With Automotive Applications—Jun. 20, 2005—IEEE Workshop on Machine Vision for Intelligent Vehicles.
A Night Vision Module for the Detection of Distant Pedestrians—Jun. 1, 2007—Intelligent Vehicles Symposium—2007 IEEE.

(Continued)

*Primary Examiner* — Daniel Mariam
(74) *Attorney, Agent, or Firm* — Brinks Gilson & Lione

(57) ABSTRACT

A method of automatically detecting objects in front of a motor vehicle comprises the steps of pre-storing template objects representing possible objects in front of the motor vehicle, detecting images from a region in front of the vehicle by a vehicle mounted imaging means, generating a processed image containing disparity or vehicle-to-scene distance information from the detected images, comparing the pre-stored template objects with corresponding regions-of-interest of the processed image, and generating a match result relating to the match between the processed image and the template objects. Each of the pre-stored template objects is a flat two-dimensional multi-pixel area of predetermined shape.

14 Claims, 4 Drawing Sheets

(56) References Cited

OTHER PUBLICATIONS

Tracking All Traffic—Computer Vision Algorithms for Monitoring Vehicles, Individuals, and Crowds—Mar. 1, 2005—IEEE Robotics & Automation Magazine, IEEE Service Center, vol. 12—No. 1—pp. 29-36.
International Search Report and Written Opinion—Jul. 23, 2010.
International Search Report—May 3, 2010.

* cited by examiner

METHOD AND SYSTEM OF AUTOMATICALLY DETECTING OBJECTS IN FRONT OF A MOTOR VEHICLE

CROSS REFERENCE TO RELATED APPLICATIONS

This application is based on European Patent Application No. 09002172.6, filed Feb. 17, 2009, and PCT International Application No. PCT/EP2010/000679, filed Feb. 4, 2010. The entire content of both applications is hereby incorporated by reference.

BACKGROUND

1. Field of the Invention

The invention relates to a method and system of automatically detecting objects in front of a motor vehicle, comprising the steps of pre-storing template objects representing possible objects in front of the motor vehicle, detecting images from a region in front of the vehicle by a vehicle mounted imaging means, generating a processed image containing disparity or vehicle-to-scene distance information from the detected images, comparing the pre-stored template objects with corresponding regions-of-interest of the processed image, and generating a match result relating to the match between the processed image and the template objects.

2. Related Technology

U.S. Pat. No. 7,263,209 B2 discloses a method comprising the steps of detecting images from a region in front of the vehicle, generating a depth map from the detected images, matching template objects to the depth map, and determining that an object is present in front of the motor vehicle if the result of the matching fulfils a predetermined condition.

SUMMARY

An object of the invention is to provide a cost-effective method and system of automatically detecting objects in front of a motor vehicle with reduced memory requirements. This invention considers that a flat two-dimensional template object can be defined by only a few numbers requiring only a very small amount of memory. Therefore, the memory used to store and process the template objects can be significantly reduced. This has several advantages. For example, calculations involving template objects may be performed significantly faster because the number of memory accesses can be greatly reduced. As a result, the use of flat two-dimensional template objects can lead to a reduced processing time which is particularly advantageous on hardware with limited processing capabilities. Furthermore, the size of memory devices may be reduced which potentially leads to reduced costs.

In one preferable aspect, the template objects are arranged orthogonally to a sensing plane. Furthermore, the template objects are preferably arranged to stand on a ground plane, because it can be assumed that objects to be detected stand on the ground. In this manner, the required number of templates can be greatly reduced.

In a further preferable aspect the two-dimensional area has a rectangular shape which simplifies the image processing calculations to be performed over the region-of-interest. For the same reason, preferably to each template object at least one constant value is assigned, representing a disparity or distance value of the template object.

In a further preferable aspect of the invention, the processed image is a disparity image or disparity map wherein a single disparity value, representing a difference of the corresponding point in the scene between the left/right stereo images, is assigned to every pixel of the disparity map. In general, the greater the computed disparity of an imaged pixel is, the closer the pixel is to the sensing arrangement. However, the processed image may also be a depth image or depth map wherein an individual depth value, representing the distance of the corresponding point in the scene to the vehicle, is assigned to every pixel of the depth map.

In a further preferable aspect, the processing time can be significantly reduced by calculating an average disparity or average depth value for a region-of-interest in the measured image. The average disparity or depth value may then be subtracted from the expected disparity or depth value of the template object. In a further preferred aspect, calculation of average disparity or depth values for different regions-of-interest in the measured image can be significantly simplified by generating an integrated disparity or depth map. The integration of disparity or depth values then has to be performed only once over the whole disparity or depth map, and the calculation of the integrated disparity or depth for different regions-of-interest reduces to a simple subtraction operation involving only a few numbers.

Rather than calculating average disparity or depth values over a whole region-of-interest in the measured image, another aspect of the invention improves reliability and robustness of the object detection by partitioning the region-of-interest into several multi-pixel sub-regions or sub-areas of predetermined shape and calculating an average disparity or depth value for every sub-region.

This improves the matching reliability but still provides significant processing speed enhancement compared to the conventional pixel-by-pixel calculations.

DETAILED DESCRIPTION

Figure 1:
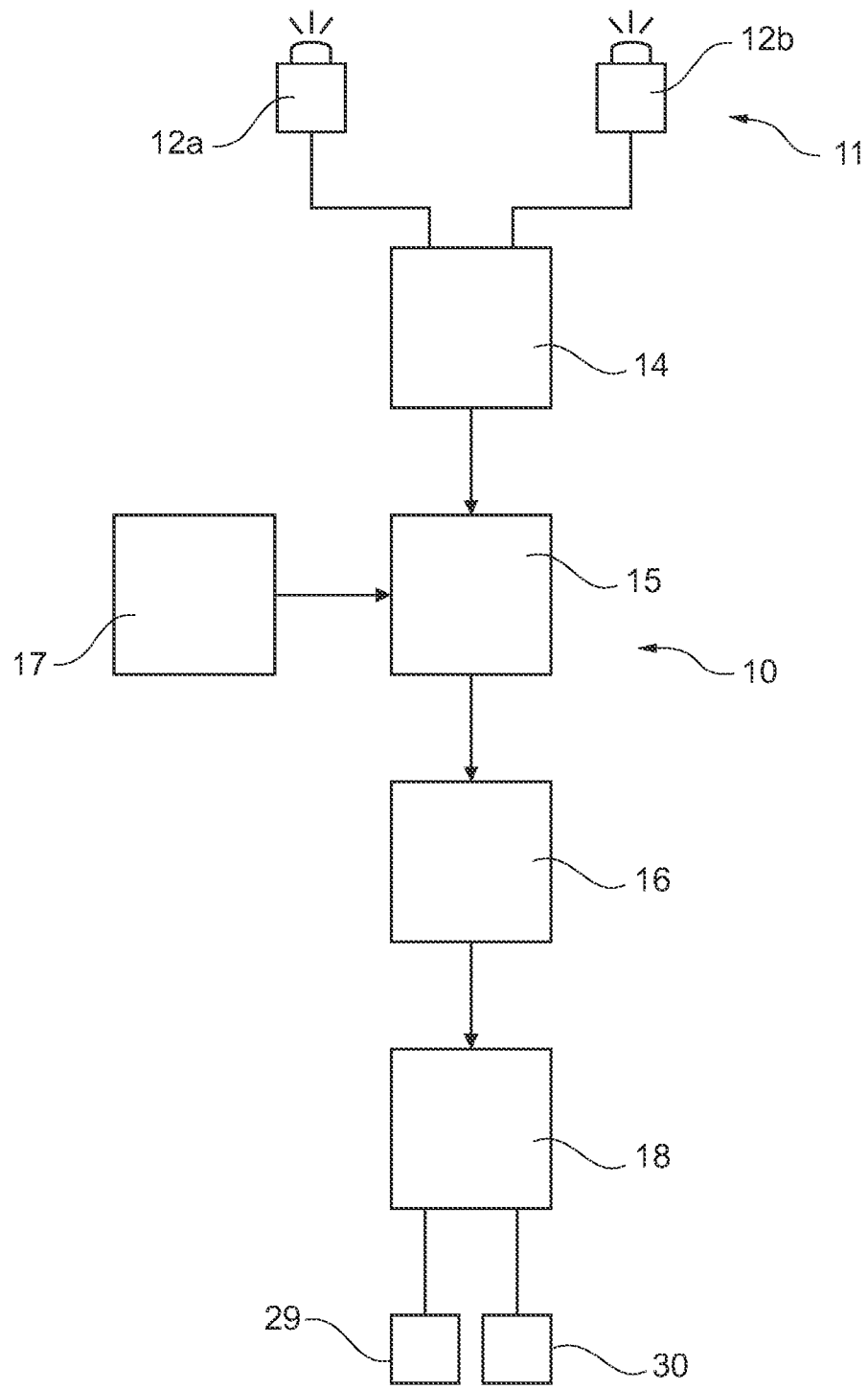
FIG. 1 shows a schematic view of a safety system for a motor vehicle.

As schematically shown in FIG. 1, safety system 10 is mounted in a motor vehicle and comprises an imaging means 11 for detecting images of a region in front of a motor vehicle. The imaging means 11 comprises one or more imaging sensors preferably one or more optical and/or infrared cameras 12a and 12b, where infrared covers near IR and/or far IR. In one embodiment the imaging means 11 comprises stereo cameras 12a and 12b; alternatively a mono camera can be used.

The cameras 12a and 12b are coupled to an image pre-processor 14 which may be incorporated into a dedicated hardware circuit. Image pre-processor 14 is adapted to calibrate the cameras 12a and 12b, control the capture and digitizing of the images, warp them into alignment, merge left/right images into single images, and perform pyramid wavelet decomposition to create multi-resolution disparity images, all of which is known in the art.

Figure 2:
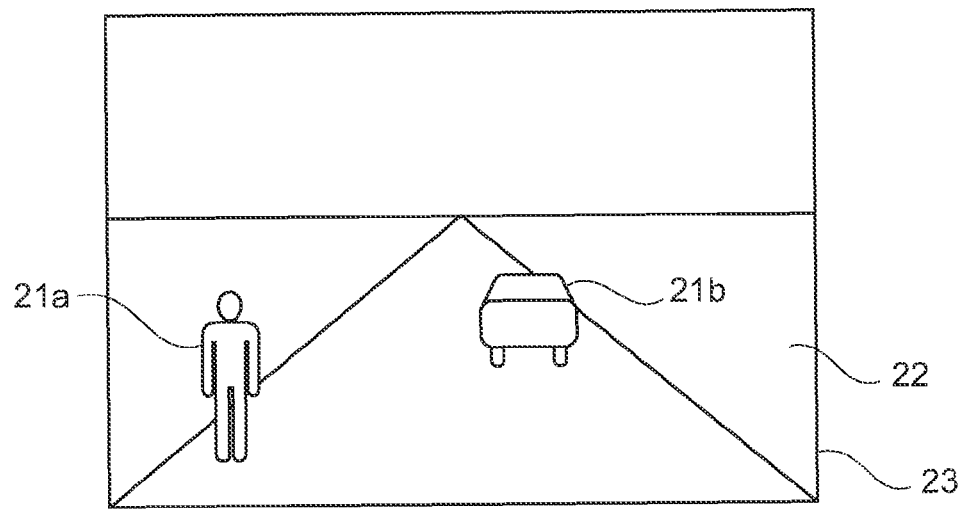
FIG. 2 shows a simplified disparity image of a region in front of a motor vehicle.

Image processing of the pre-processed images is then performed in image processing means comprising an object identification means 15 and an object tracking means 16. Object identification means 15 preferably generates a disparity image or disparity map 23 in which an individual disparity value, representing a difference of the corresponding point in the scene between the left/right stereo images, is assigned to every pixel of the disparity map. FIG. 2 shows a schematic view of an exemplary disparity map 23 with two objects to be identified; however, the disparity values in the third dimension are not indicated. In reality the disparity image may be for example a greyscale image where the grey value of every pixel represents a distance between the corresponding point in the scene in the left/right stereo images.

The disparity map 23 is then compared in the object identification means 15 to template images or template objects 20a and 20b, for example, contained in a template database 17 pre-stored in a memory. See FIG. 4. The template objects 20a, 20b, are models of possible objects in front of the motor vehicle. The template objects 20a, 20b, etc. are two-dimensional images of predetermined shape which are flat in the third dimension. This means that only one constant value, for example a constant grey value, indicating the expected disparity or depth of the template object, is assigned to the template image as a whole. In particular, template objects 20a, 20b, etc. contain no information relating to individual image points or pixels.

The shape of the template objects 20a, 20b, etc. is preferably rectangular. This allows the template object to be defined by four image coordinates of the corners and simplifies the calculation of the match score, as described below.

Figure 4:
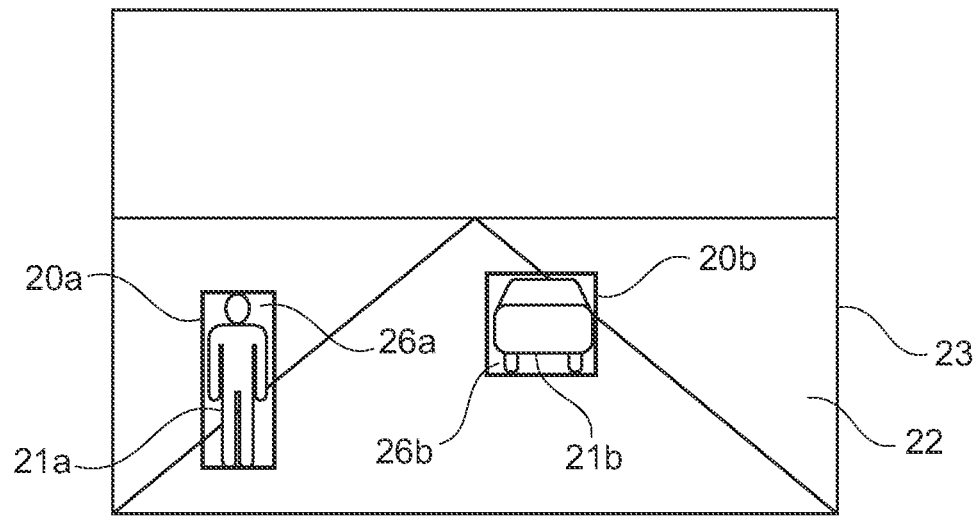
FIG. 4 shows a simplified disparity image with matching template objects.

FIG. 4 shows only two template objects 20a and 20b providing a perfect match with two exemplary objects 21a and 21b. In reality, template images of different size and/or shape, representing different kinds of objects, for example pedestrians 21a, vehicles 21b, bicyclists, motorbikes and so on may be provided. Furthermore, template images for a specific object are arranged at given intervals along the ground in the longitudinal and lateral direction in order to cover all possible positions of the object. Preferably the template objects 20a, 20b, etc. are arranged to stand on a ground plane 22, which is determined in advance by calibration or can be calculated from the image data, in order to reasonably reduce the number of template objects required. Furthermore, the template objects 20a, 20b, etc. are preferably arranged orthogonally to a sensing plane which is an essentially horizontal, vehicle-fixed plane through the cameras 12a and 12b.

The comparison between every template object 20a, 20b, etc. read out of the template database 17 and the disparity map 23 may be based on a pixel-by-pixel calculation of the difference between the individual disparity value of each pixel in the detected image and the expected disparity value of the template object, where the calculation is performed over a region-of-interest 26a, 26b defined by the template object 20a, 20b. A match score may then be calculated for example as the percentage of pixels for which the absolute magnitude of the above mentioned difference is smaller than a predetermined threshold.

In comparison to the above described pixel-by-pixel difference calculation, the comparison between the template objects 20a, 20b, etc. and the disparity map 23 may be significantly speeded up by calculating an average disparity value of the disparity map 23 in the region-of-interest 26a, 26b defined by the template object 20a, 20b under inspection, and subtracting the constant disparity value of the template object under inspection, or vice versa. In general, the lower the absolute value of this difference of two single numbers is, the higher is the corresponding match score. In general, calculating an average disparity value of the disparity map 23 in the region-of-interest 26a, 26b can be performed significantly faster than calculating disparity differences for every pixel.

Figure 3:
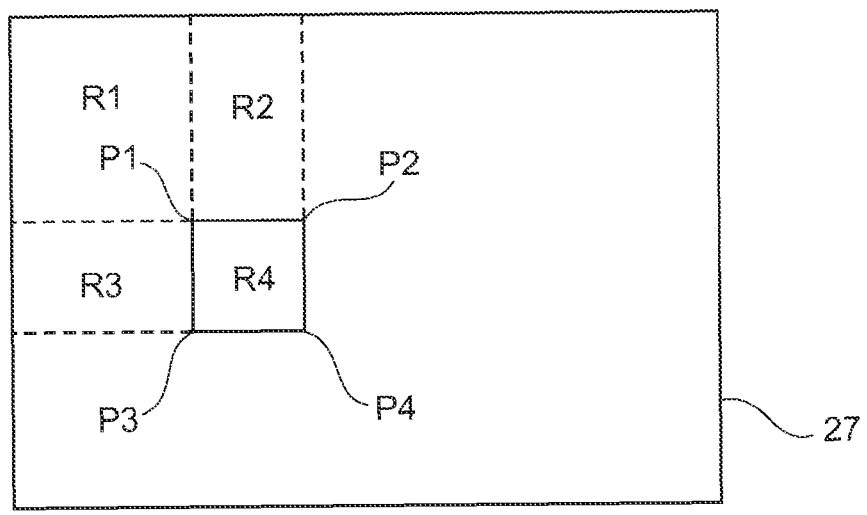
FIG. 3 shows a simplified integrated disparity image generated from a disparity image.

The average disparity value of the disparity map 23 in the region-of-interest can be calculated as the disparity value integrated over the region-of-interest in the disparity map 23, divided by the area of the region-of-interest. The disparity value integrated over the region-of-interest in the disparity map 23 is preferably calculated by using an integrated disparity map 27, a simplified example of which is shown in FIG. 3. FIG. 3 does not, however, depict the individual integrated disparity values assigned to the pixels. In reality the integrated disparity map 27 may, for example, be a greyscale image where the greyscale value of every pixel indicates the corresponding integrated disparity value.

In the integrated disparity map 27, to each pixel an individual integrated disparity value is assigned. The integrated disparity value assigned to a pixel may be calculated as the sum of all disparity values of a region suitably related to that point. For example in FIG. 3, the value assigned to a pixel in the integrated disparity map 27 may be calculated as the sum of the disparity values of all pixels which are located to the top and to the left of the pixel under consideration. This means that the integrated disparity value of point P1 is the sum of all disparity values in the region R1 of the disparity map 23; the integrated disparity value of point P2 is the sum of all disparity values in the regions R1 and R2; and so on. The integrated disparity value in the region-of-interest R4 defined by the corner points P1, P2, P3, P4 is then the integrated disparity value of P1 plus the integrated disparity value of P4 minus the integrated disparity value of P2 minus the integrated disparity value of P3. In other words, once the integrated disparity map 27 has been calculated, the calculation of the difference between a template object and the disparity map in the corresponding region-of-interest reduces to a simple arithmetic operation involving only a few, here five, numbers.

Of course there are other ways of calculating an integrated disparity map 27. For example, the integrated disparity value assigned to a pixel in the integrated disparity map may be calculated as the sum of the disparity values assigned to all pixels to the top and to the right of that point, etc.

Figure 6:
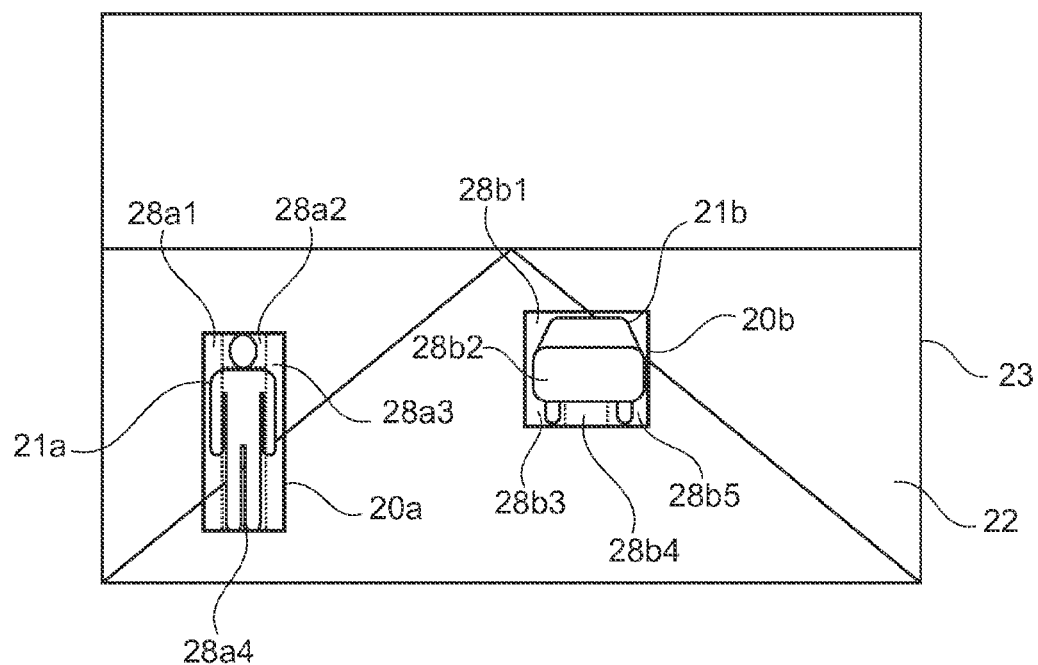
FIG. 6 shows a simplified disparity image with template objects according to another embodiment.

If average disparity values are used as described above, the reliability and robustness of the object detection can be improved according to a further embodiment of the invention exemplary illustrated in FIG. 6. In this embodiment, the template objects 20a and 20b are comprised of a plurality of preferably rectangular sub-areas such as 28a1, 28a2, 28a3, and 28b1, 28b2, 28b3 etc. forming a contiguous, preferably rectangular template area of regions of interest 26a, 26b. Each sub-area 28a and 28b comprises a plurality of pixels, i.e. forms at least a (2 pixel)×(2 pixel) area, where pixel as usual means an elementary image point. Still only one constant disparity value, for example a constant grey value, indicating the expected disparity of the template object is assigned to each template object 20a, 20b. In this embodiment, the average disparity value is not calculated over the whole region-of-interest 26a, 26b, but an individual average disparity value is calculated for each sub-area 28a and 28b of a template object 26a and 26b under consideration. A match score may then be calculated for example as the percentage of sub-areas 28a and 28b for which the absolute magnitude of the difference between the disparity value of the sub-area under consideration and the expected disparity value of the corresponding template object is smaller than a predetermined threshold. The average disparity value in each sub-region can be calculated in the same manner as described above by using an integrated disparity map. In this embodiment, the risk of falsely detecting ghost objects can be greatly reduced, while still consuming significantly less processional resources as compared to a pixel-by-pixel calculation of disparity differences.

A combination of the above-described embodiments, comprising template images for which an overall average disparity value is calculated and template images for which average disparity values in a plurality of sub-regions are calculated, is also possible.

Figure 5:
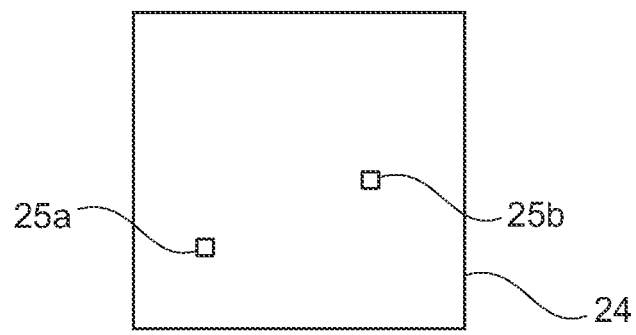
FIG. 5 shows a simplified score map for the disparity map shown in FIG. 4.

Referring to the exemplary depiction in FIG. 5, a preferred method of identifying an object based on the above comparison may be accomplished in the following manner. For every template object 20a, 20b, etc. read out of the template data-base 17, the calculated match score value is saved to a score map 24 In the score map 24, one axis (here the horizontal axis) corresponds to the horizontal axis of the detected image and the other axis (here the vertical axis) is the longitudinal distance axis. Therefore, the score map 24 may be regarded as a birds-eye view on the region in front of the vehicle. All calculated score values are inserted into the score map 24 at the corresponding position in the form of a small patch field to which the corresponding score value is assigned, for example in form of a grey value.

In order to ensure as few detections as possible, optimally only one detection per object, in the final score map 24 preferably the local extrema (local maxima or local minima depending on how the score is calculated) are identified and a non-extremum suppression is carried out, leaving only the extremal score values. For the exemplary disparity map 23 shown in FIG. 4, the score map 24 after non-extremum suppression is shown in FIG. 5, where for each exemplary object 21a, to be identified one corresponding score value 25a, 25b is present in the score map 24.

An additional step of verifying or validating an object may be provided in the object identification means 15, for example discriminating the match score of the object against a predetermined threshold, and/or using a validation signal from a sensor independent of the camera 12.

An object identified in the object identification means 15 is then tracked by the object tracking means 16.

Based on the information on the object returned by the object identification means 15 and object tracking means 16, for example object distance, position, speed, size and/or classification, a decision means 18 may activate or control safety means such as warning means 29 and display means 30. For example if decision means 18 determines that there is a non-negligible risk of a collision with a detected object, a warning means 29 adapted to warn the driver is preferably activated. The warning means 29 suitably provides optical, acoustical and/or haptical warning signals. Further safety means not shown in FIG. 1 may be activated or suitably controlled, for example restraint systems such as occupant airbags or safety belt tensioners; pedestrian airbags, hood lifters and the like; or dynamic vehicle control systems such as brakes.

On the other hand, if the decision means 18 determines that the risk of collision with a detected object is negligible, for example in case of a pedestrian at the safe roadside, the decision means 18 may instruct a display means 30 only to display information indicating the object.

The object identification means 15, object tracking means 16 and/or the decision means 18 are preferably incorporated into a programmable electronic control means which may comprise a microprocessor or micro-controller. The template data-base 17 is preferably stored in an electronic memory. The programmable electronic control means and the electronic memory may be incorporated for example in an on-board ECU and may be connected to the sensing arrangement such as cameras 12a and 12b and the safety means such as warning means 29 and display means 30 via an on-board data bus. All steps from imaging, image pre-processing, image processing, to activation or control of safety means are performed continuously during driving in real time.

In the above described embodiments the pre-stored template objects are matched to a disparity map, which has the advantage that the time-consuming calculation of a depth map can be avoided. However, it is also possible to match the pre-stored template objects to a calculated depth map where an individual depth value representing the distance between the corresponding point in the scene and the vehicle, obtained from the distance information contained in the disparity image, is assigned to every pixel of the depth map.

While the above description constitutes the preferred embodiment of the present invention, it will be appreciated that the invention is susceptible to modification, variation, and change without departing from the proper scope and fair meaning of the accompanying claims.

The invention claimed is:

1. A method of automatically detecting objects in front of a motor vehicle, comprising the steps of:
   pre-storing template objects representing possible objects in front of the motor vehicle;
   detecting images from a region in front of the vehicle by a vehicle mounted imaging means;
   generating from the detected images a processed image containing disparity or vehicle-to-scene distance information and regions-of-interest;
   comparing the pre-stored template objects with corresponding regions-of-interest of the processed image;
   generating a match result relating to the match between the processed image and the template objects, and
   wherein each of the pre-stored template objects is a flat two-dimensional multi-pixel area of predetermined shape.

2. The method of claim 1 wherein the template objects are arranged orthogonally to a sensing plane.

3. The method of claim 1 wherein the template objects are arranged to stand on a ground plane.

4. The method of claim 1 wherein the two-dimensional area has a rectangular shape.

5. The method of claim 1 wherein one constant value relating to an expected disparity of the template object is assigned to each of the template object.

6. The method of claim 1 further comprising the step of generating an integrated processed image from the processed image.

7. The method of claim 1 further comprising the step of calculating an average value of the processed image in the region-of-interest defined by the template object.

8. The method of claim 7 wherein the template object is comprised of a plurality of multi-pixel sub-regions of predetermined shape.

9. The method of claim 8 further comprising the step of calculating an average value of the processed image for each of the sub-regions.

10. The method of claim 8 wherein the sub-regions have a rectangular shape.

11. The method of claim 1 further comprising the step of calculating a match score for each of the template objects.

12. The method of claim 11 further comprising the step of generating a score map from the match scores.

13. The method of claim 12 further comprising the step of identifying local extrema in the score map.

14. The method of claim 13 further comprising the step of performing a non-extremum suppression in the score map.

\* \* \* \* \*